V. WILLOUGHBY.
DRAFT GEAR COUPLING YOKE.
APPLICATION FILED AUG. 5, 1913.

1,132,819.

Patented Mar. 23, 1915.

2 SHEETS—SHEET 1.

WITNESSES:
H. N. Hennessy
L. V. Joyce

INVENTOR.
Victor Willoughby
BY J. H. Gibbs
ATTORNEY

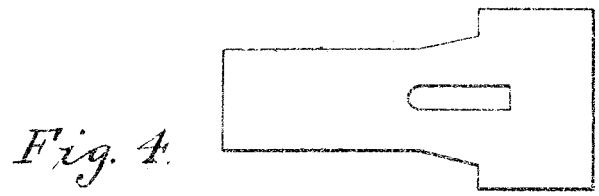
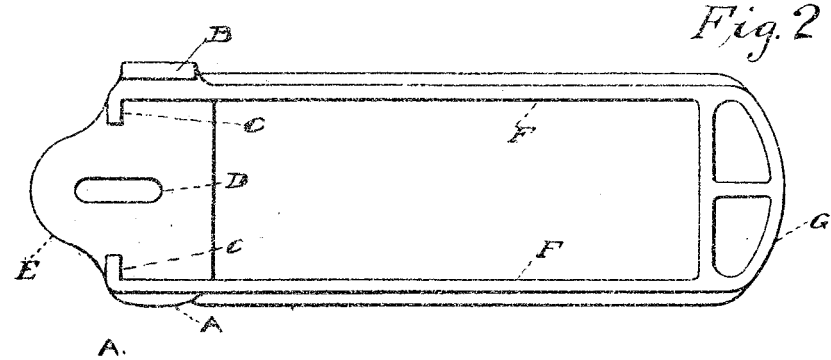
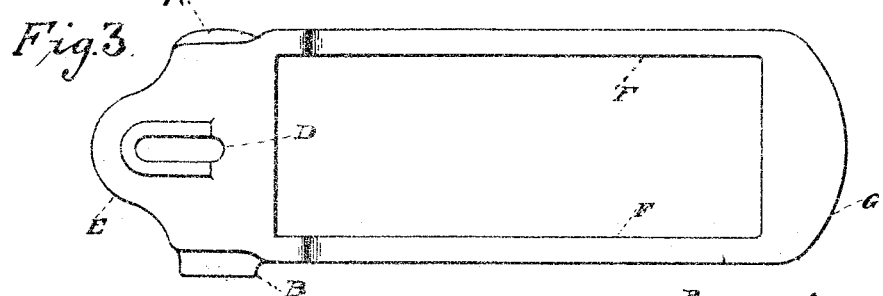
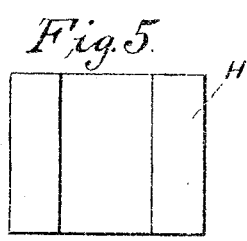
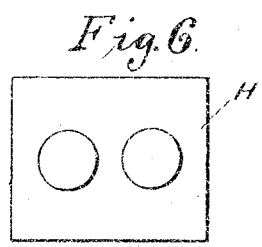
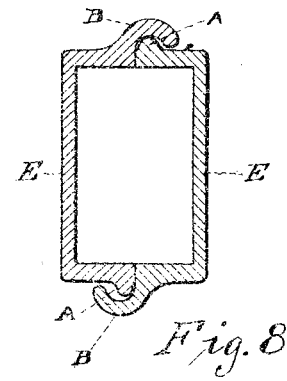

UNITED STATES PATENT OFFICE.

VICTOR WILLOUGHBY, OF JEFFERSONVILLE, INDIANA, ASSIGNOR, BY DIRECT AND MESNE ASSIGNMENTS, TO WILLIAM H. MINER, OF CHAZY, NEW YORK.

DRAFT-GEAR COUPLING-YOKE.

1,132,819.     Specification of Letters Patent.     Patented Mar. 23, 1915.

Application filed August 5, 1913. Serial No. 783,168.

*To all whom it may concern:*

Be it known that I, VICTOR WILLOUGHBY, residing at Jeffersonville, Indiana, and being a citizen of the United States, have invented certain new and useful Improvements in Draft-Gear Coupler-Yokes, of which the following is a full, clear, and exact description, such as will enable others skilled in the art to which it appertains to make and to use the same, reference being had to the accompanying drawings, which illustrate the preferred form of the invention, though it is to be understood that the invention is not limited to the exact details of construction shown and described, as it is obvious that various modifications thereof will occur to persons skilled in the art.

Figure 7:
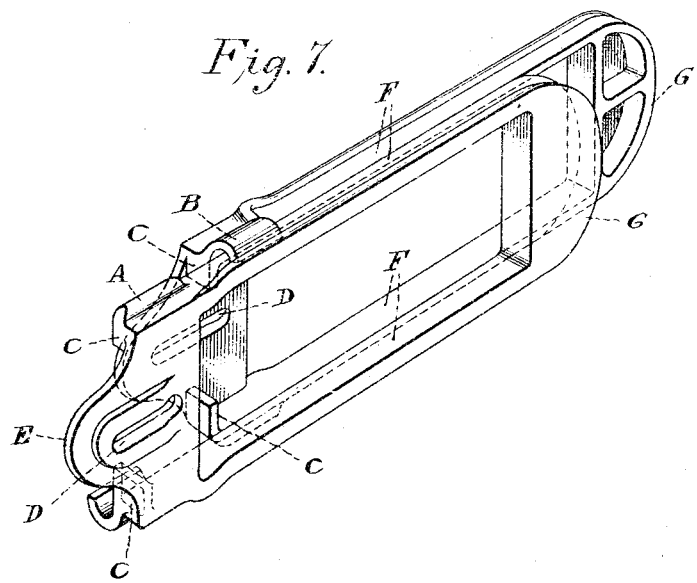
Figure 1:
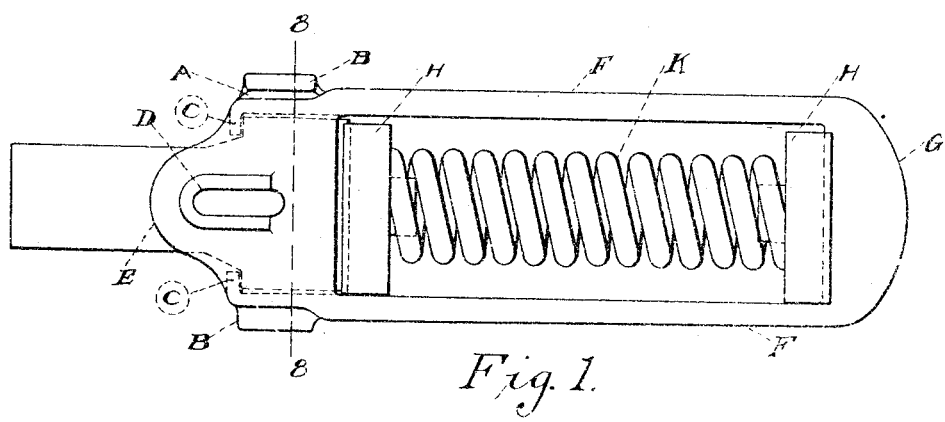

In said drawings: Figure 1 is a side elevational view of a yoke held in position upon a coupler shank, a fragment only of the latter being shown. Fig. 2 is a side elevational view looking at the interior of one of the sections of the yoke. Fig. 3 is a side elevational view of a companion section to the section shown in Fig. 2. Fig. 4 is an elevational view showing in side elevation the contour of the ordinary commercial coupler shank to which the yoke is adapted to be connected. Fig. 5 is a face view of the exterior end portion of one of the followers, and Fig. 6 is a face view of the interior portion of one of the followers. Fig. 7 is an isometric perspective view, showing the two halves of the coupler yoke about to be connected by longitudinal sliding movement of one upon the other. Fig. 8 is a sectional view taken on line 8—8 of Fig. 1, through the connection means employed to lock the parts of the yoke in operative position.

The object of the invention is to provide a yoke which is preferably formed of cast steel, though drop forging may be substituted, if desired, which yoke is composed of two relatively similar sections adapted to be connected with the rear end of a coupler shank by movement transversely with relation to the coupler shank and longitudinally with relation to the parts of the yoke, whereby the yoke is firmly secured in position upon the rear end of the coupler shank without using keys, pins, bolts or other locking means for that purpose.

While the yoke is adapted to be locked in position upon a coupler shank without the employment of extraneous connecting means, the invention comprises means whereby the yoke may be attached to a coupler shank by means of the transversely extending key, if desired, which key when employed serves as a means to prevent incidental disconnection of the yoke from the coupler.

Each half of the yoke or loop is provided with a lug A and a clip B, both located at the forward end of the loop. In assembling the two parts of the loop, one casting is laid on the coupler. The other casting is then laid on the coupler and moved forward far enough for the lugs to pass inside the clips. It is then moved backwardly until the lip C engages the front end of the coupler tail piece. The draft gear is then placed in the loop and locks the two parts of the loop together and to the coupler. The slot D is provided in the tail piece E so that, if desired, (although it is not necessary) a key may be used extending through the slot D and through a co-incident slot in the coupler shank.

The straps F of the yoke or loop are shown as angle-shaped in cross section to provide an outstanding stiffening flange, which flange may or may not be formed thereon, as desired. The rear end of the yoke or loop at G may be of any desired shape. The followers H may be of any convenient form, and the form illustrated in the drawing is shown merely for the purpose of illustrating an operative device. The springs K, which are illustrated in the drawing, are for the same purpose and are not a part of the present invention, the followers and springs being illustrated merely to show the position of a draft gear when inserted in the yoke. In operation it will be necessary for one section to slip by this companion section the full length of the lugs, before indicated, before it can be removed from the coupler head. Inasmuch as the lugs are made double the length of the motion of any draft gear now in service, it will be impossible for the loop to become disengaged from the coupler in service. The rear ends of the yoke are not secured together, and it is not necessary that they be secured together, for the reason that the conventional back stops or draft lugs employed with commercial draft gear will prevent separation at the rear end.

It is to be noted that the halves or sections of the yoke are necessarily moved transversely of the coupler shank to place them in position with the lips C forwardly of the shoulder on the tail piece of the coupler shank and in close proximity thereto, after which the expansion of the draft gear elements, represented typically by the followers H and springs K, will bear against the rear face of the coupler shank and hold the parts in interlocked position.

Where friction draft gears are employed, such friction draft gears are commonly provided with special forms of front and rear followers, which may be readily adapted for use in connection with a yoke comprising the present invention, hence I do not wish to be limited to any specific type of followers or other details commonly incident to draft gears as distinguished from the yokes with which they are associated in service.

What I claim is:

1. A draft gear yoke formed of two interlocking loops which are adapted to be applied to a coupler by transverse movement of each loop and by longitudinal movement of one loop upon its companion loop.

2. A draft gear yoke formed of two loops adapted to be applied to a coupler and to interlock with each other by movement of one loop longitudinally upon its companion loop upon said coupler.

3. A draft gear yoke formed of two loops longitudinally separated and adapted to be brought into interlocking engagement with a coupler and with each other by movement of one loop longitudinally of the other loop.

4. A draft gear yoke formed of two relatively parallel loops and means on one of said loops adapted to interlock with coöperating means on the other loop upon longitudinal movement of one loop with relation to the other loop.

5. In a draft gear yoke, the combination comprising two independently formed loops, each of which is formed with integral means adapted to engage coöperating means on the other loop.

6. In a draft gear yoke, the combination comprising two separately formed loops divided longitudinally from end to end, an integral projection on each loop lapping the other loop, and an integral member adapted to engage with said projection.

7. In a draft gear yoke, two separately formed loops each of which is formed with a lip, and interengaging parts on said loops adapted to be separated by longitudinal movement of one of said loops.

8. In a draft gear yoke, two separately formed loops each of which is formed with a lip, and interengaging parts on said loops adapted to be separated by longitudinal movement of either of said loops.

9. In a draft gear yoke, two separately formed loops divided longitudinally from end to end, a lateral extension on each loop lapping its companion loop, and means on each loop adapted to interlock with said extension.

10. In a draft gear yoke, the combination comprising parallel loops, each of which is provided with integral means adapted to interlock with coöperating means on the other loop, and each loop provided with means adapted to engage with an opposite side of a coupler.

11. A draft gear yoke comprising two loops each of which is provided with a head piece and with means thereon adapted to engage a coupler shank and each loop being provided with means adapted to be brought into interlocking engagement with the other loop by movement of one loop upon its companion loop.

12. A cast yoke for railway draft riggings which consists of two separate and like parts having integral means for detachably connecting the same together, said means including overlapping and interlocking flanges, substantially as specified.

13. A cast yoke for railway draft riggings which consists of two separate and like parts provided with integral means adapted to prevent lateral separation of the parts when assembled and at the same time permitting relative longitudinal sliding movement therebetween, substantially as specified.

14. In a draft gear yoke, two separately formed loops each of which is provided with inwardly turned shoulders adapted to engage a coupler and means integral with said loops adapted to lock them in movably operative position on said coupler.

15. In a draft gear yoke, two separately formed loops each of which is provided with a key way, shoulders on said loops adapted to engage a coupler and means integral with said loops adapted to secure said loops in operative engagement.

16. A draft gear yoke formed of two relatively parallel loops and means on each of said loops adapted to lap the other loop to lock said loops in movably operative relation.

17. A draft gear yoke formed of two interlocking loops which are adapted to be connected by transverse movement of one loop with relation to the other loop, said loops being independently movable when applied to a coupler.

18. In a draft gear yoke, two separately formed loops each of which is provided with a lip adapted to lap the other loop to retain said loops in operative position.

19. In a draft gear yoke, two separately formed loops each of which is provided with a slotted head piece and with shoulders adapted to engage a coupler and means integral with each loop adapted to lap the other loop to retain them in operative relation.

20. In a draft gear yoke, two separately formed loops each of which is provided with a slotted head piece and with shoulders adapted to engage a coupler and with integral means adapted to lock said loops in operative relation.

21. A draft gear yoke formed of two loops adapted to be applied to a coupler and to interlock with each other by movement of one loop upon its companion loop.

22. A draft gear yoke comprising a pair of loops, shoulders on said loops adapted to engage a coupler, said loops having integral interlocking means.

23. In a draft gear yoke in combination, two independently formed loops, integral means upon one of said loops adapted to interlock with the other loop to hold the loops in assembled relation.

In witness whereof I have hereunto set my hand in the presence of two witnesses.

VICTOR WILLOUGHBY.

Witnesses:
   THEODORE E. LYONS,
   C. B. BEESON.